(12) United States Patent
Mu et al.

(10) Patent No.: US 10,716,067 B2
(45) Date of Patent: Jul. 14, 2020

(54) SYSTEMS AND METHODS FOR TRANSMITTING A WAKE-UP RADIO SIGNAL TO LOW POWER DEVICES IN A WIRELESS COMMUNICATION SYSTEM

(71) Applicant: Marvell World Trade Ltd., St. Michael (BB)

(72) Inventors: Hua Mu, San Jose, CA (US); Rui Cao, Fremont, CA (US); Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/708,507

(22) Filed: Sep. 19, 2017

(65) Prior Publication Data

US 2018/0084501 A1    Mar. 22, 2018

Related U.S. Application Data (60) Provisional application No. 62/396,955, filed on Sep. 20, 2016.

(51) Int. Cl.
*H04W 52/02* (2009.01)
*H04L 27/26* (2006.01)
(Continued)

(52) U.S. Cl.
CPC ......... *H04W 52/0235* (2013.01); *H04L 12/28* (2013.01); *H04L 27/26* (2013.01); *H04L 27/2602* (2013.01); *H04L 27/2613* (2013.01); *H04L 41/0803* (2013.01); *H04L 69/324* (2013.01); *H04W 52/0229* (2013.01); *H04W 68/00* (2013.01); *H04L 5/0007* (2013.01); *H04L 5/0053* (2013.01); *H04L 27/04* (2013.01);
(Continued)

(58) Field of Classification Search
None
See application file for complete search history.

(56) References Cited

U.S. PATENT DOCUMENTS

| | | | |
|---|---|---|---|
| 2009/0290537 A1* | 11/2009 | Berglund | H04L 12/4633 370/328 |
| 2011/0074552 A1* | 3/2011 | Norair | G06K 7/0008 340/10.1 |

(Continued)

OTHER PUBLICATIONS

International Search Report and Written Opinion for International Application No. PCT/US2017/052278 dated Jan. 11, 2018.

*Primary Examiner* — Hong S Cho (57) ABSTRACT

Embodiments described herein provide a method for transmitting a wake-up radio signal to low power devices in a wireless local area network. Data for transmission to a wireless device is received at a wireless access point, and a wake-up radio packet is generated. The wake-up signal includes a first preamble, a second preamble, and payload data including a wake-up user identifier assigned to the wireless device. The wake-up radio packet is encoded into an encoded wake-up radio frame including a plurality of encoded data symbols representing modulated payload data. The encoded wake-up radio frame is modulated onto a modulated waveform for transmission. A signal corresponding to the modulated waveform is transmitted to the wireless device.

19 Claims, 5 Drawing Sheets

(51) Int. Cl.
    *H04L 12/28*       (2006.01)
    *H04W 68/00*      (2009.01)
    *H04L 12/24*       (2006.01)
    *H04L 29/08*       (2006.01)
    H04L 27/04       (2006.01)
    H04L 5/00        (2006.01)
    H04L 27/12       (2006.01)
    H04W 84/12     (2009.01)
    H04W 88/08     (2009.01)

(52) U.S. Cl.
    CPC ............. *H04L 27/12* (2013.01); *H04W 84/12* (2013.01); *H04W 88/08* (2013.01); *Y02D 70/00* (2018.01); *Y02D 70/10* (2018.01); *Y02D 70/14* (2018.01); *Y02D 70/142* (2018.01)

(56) References Cited

U.S. PATENT DOCUMENTS

| | | | |
|---|---|---|---|
| 2011/0194471 A1* | 8/2011 | Kim | H04W 52/0235 |
| | | | 370/311 |
| 2016/0374020 A1* | 12/2016 | Azizi | H04W 52/0229 |
| 2017/0195881 A1* | 7/2017 | Nishida | H04M 11/00 |
| 2017/0280498 A1* | 9/2017 | Min | H04L 5/0053 |
| 2018/0019902 A1* | 1/2018 | Suh | H04L 5/0007 |
| 2018/0077641 A1* | 3/2018 | Yang | H04L 69/22 |

* cited by examiner

SYSTEMS AND METHODS FOR TRANSMITTING A WAKE-UP RADIO SIGNAL TO LOW POWER DEVICES IN A WIRELESS COMMUNICATION SYSTEM

CROSS-REFERENCE TO RELATED APPLICATION

This disclosure claims the benefit under 35 U.S.C. § 119(e) of U.S. Provisional Patent Application No. 62/396,955, filed Sep. 20, 2016, which is hereby incorporated by reference herein in its entirety.

FIELD OF USE

This disclosure relates to managing lower power (LP) devices in a wireless communication system, and specifically, to transmitting a wake-up radio (WUR) signal to LP devices in a wireless communication system.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

In existing systems, a wireless local area network (WLAN) is usually used in an environment to interconnect a group of user devices, such as the Internet of Things (IoT) devices. For example, in a home environment, devices such as a thermostat, a laptop computer, a smart phone, a television set-top box, and/or the like, can be interconnected under the home WLAN. Such user devices are often LP WiFi devices, which may transit into a sleep mode by turning off the WiFi module to save power, when the device is not in use. To maintain the connection between an access point (AP) and a LP device of the WLAN, for example, the AP may transmit a WUR signal to wake up the LP device, e.g., a thermostat, such that the thermostat is notified and thus prepared to receive data packets of configuration data on the regular WiFi from the AP. However, the WUR mechanism, e.g., the transmission and receipt of the WUR signal, has not been specified under the current 802.11 standard.

SUMMARY

Embodiments described herein provide a method for transmitting a wake-up radio signal to low power devices in a wireless local area network. Data for transmission to a wireless device is received at a wireless access point, and a wake-up radio packet is generated. The wake-up signal includes a first preamble, a second preamble, and payload data including a wake-up user identifier assigned to the wireless device. The wake-up radio packet is encoded into an encoded wake-up radio frame including a plurality of encoded data symbols representing modulated payload data. The encoded wake-up radio frame is modulated onto a modulated waveform for transmission. A signal corresponding to the modulated waveform is transmitted to the wireless device.

In some embodiments, the first preamble defined by a wireless communication protocol operable with the wireless local area network is configured, and the second preamble is configured as identifying a type of the wake-up radio packet.

In some embodiments, a hash value of a number representing a media access control address of the wireless device is calculated, and the hash value is assigned as the wake-up user identifier for the wireless device.

In some embodiments, a first number of bits representing the wireless device is generated, and a second number of cyclic redundancy check bits for the first number of bits is generated. The first number of bits and the second number of cyclic redundancy check bits are concatenated, and the concatenated bits are assigned as the wake-up user identifier for the wireless device.

In some embodiments, the wake-up radio packet is encoded into a plurality of one or more orthogonal frequency-division multiplexing (OFDM) symbols.

In some embodiments, when the wake-up user identifier includes a number N of bits, a bandwidth for transmitting the wake-up radio packet is divided into N sub-channels. One of the number N bits is transmitted over one of the N sub-channels using on-off keying modulation.

In some embodiments, when the wake-up user identifier includes a number N of bits, a number $2^N$ of repetition patterns is designed within a symbol time corresponding to an OFDM symbol from the plurality of OFDM symbols. A repetition pattern is determined from the number $2^N$ of repetition patterns based on the wake-up user identifier. The number N of bits are transmitted using the repetition pattern.

In some embodiments, for each OFDM symbol from the plurality of OFDM symbols, a short symbol having a duration shorter than a symbol time corresponding to the respective OFDM symbol is determined. One bit of the wake-up user identifier is transmitted during the duration corresponding to the short symbol.

In some embodiments, the duration of the short symbol is determined from a group consisting of half the symbol time, a quarter of the symbol time and one-eighth of the symbol time based on a length of the wake-up user identifier.

In some embodiments, the wake-up radio packet is encoded into a plurality of single-carrier data symbols. The modulated waveform corresponding to the plurality of single-carrier data symbols is selected based on a modulation scheme from the group of on-off keying modulation, frequency shift keying modulation, pulse-position modulation and pulse-amplitude modulation.

Embodiments described herein include a system for transmitting a wake-up radio signal to low power devices in a wireless local area network. The system includes a wireless receiver, a wireless transmitter and processing circuitry at a wireless access point. The wireless receiver is configured to receive data for transmission to a wireless device. The processing circuitry is configured to generate a wake-up radio packet. The wake-up radio packet includes a first preamble, a second preamble, and payload data including a wake-up user identifier assigned to the wireless device. The processing circuitry is further configured to encode the wake-up radio packet into an encoded wake-up radio frame including a plurality of encoded data symbols representing modulated payload data, and modulate the encoded wake-up radio frame into a modulated waveform for transmission. The wireless transmitter is configured to transmit a signal corresponding to the modulated waveform to the wireless device.

In some embodiments, the processing circuitry, when generating the wake-up radio packet, is further configured to: configure the first preamble defined by a wireless communication protocol operable with the wireless local area network, and configure the second preamble as identifying a type of the wake-up radio packet.

In some embodiments, the processing circuitry, when generating the wake-up radio packet, is further configured to: calculate a hash value of a number representing a media access control address of the wireless device, and assign the hash value as the wake-up user identifier for the wireless device.

In some embodiments, the processing circuitry, when generating the wake-up radio packet, is further configured to: generate a first number of bits representing the wireless device, generate a second number of cyclic redundancy check bits for the first number of bits, concatenate the first number of bits and the second number of cyclic redundancy check bits, and assign the concatenated bits as the wake-up user identifier for the wireless device.

In some embodiments, the processing circuitry, when encoding the wake-up radio packet, is configured to encode the wake-up radio packet into a plurality of one or more OFDM symbols.

In some embodiments, the processing circuitry is further configured to when the wake-up user identifier includes a number N of bits, divide a bandwidth for transmitting the wake-up radio packet into N sub-channels, and transmit one of the number N bits over one of the N sub-channels using on-off keying modulation.

In some embodiments, the processing circuitry is further configured to when the wake-up user identifier includes a number N of bits, design a number $2^N$ of repetition patterns within a symbol time corresponding to an OFDM symbol from the plurality of OFDM symbols, determine a repetition pattern from the number $2^N$ of repetition patterns based on the wake-up user identifier, and transmit the number N of bits using the repetition pattern.

In some embodiments, the processing circuitry is further configured to for each OFDM symbol from the plurality of OFDM symbols, determine a short symbol having a duration shorter than a symbol time corresponding to the respective OFDM symbol, and transmit one bit of the wake-up user identifier during the duration corresponding to the short symbol.

In some embodiments, the processing circuitry is further configured to determine the duration of the short symbol from a group consisting of half the symbol time, a quarter of the symbol time and one-eighth of the symbol time based on a length of the wake-up user identifier.

In some embodiments, the processing circuitry is further configured to encode the wake-up radio packet into a plurality of single-carrier data symbols, and select the modulated waveform corresponding to the plurality of single-carrier data symbols based on a modulation scheme from the group of on-off keying modulation, frequency shift keying modulation, pulse-position modulation and pulse-amplitude modulation.

Embodiments described herein include a method for receiving a wake-up radio signal in a wireless communication system. A modulated signal is received, at a wireless receiver. The modulated signal is demodulated to obtain a plurality of encoded data symbols. The plurality of encoded data symbols are decoded to obtain payload data. A wake-up user identifier is identified from the payload data. It is determined whether the identified wake-up user identifier matches a previously assigned wake-up user identifier. In response to determining that the identified wake-up user identifier matches a previously assigned wake-up user identifier, a power mode associated with the wireless receiver is adjusted.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for transmitting a wake-up radio signal to low power devices in a wireless communication system.

In a WLAN environment, when an LP device is used which may constantly turns off the WiFi module to save power, to maintain the connection between the AP and the LP device, duty-cycle protocols are sometimes defined to synchronize the AP and the LP device, so that the AP is configured to wake up the LP device according to the duty-cycle protocol. However, when the data traffic between the AP and the LP device is random and sparse, the duty-cycle protocol may not be efficient or robust. The LP device is configured to engage a low-power WUR receiver in companion with the regular WiFi receiver. When the LP device enters a power-saving mode, the regular WiFi module on the LP device can be turned off, and the WUR receiver is configured to detect a WUR signal from the AP. In response to detecting the WUR signal, the LP device is configured to turn on the regular WiFi module to receive data transmission via the WiFi connection.

Specifically, a WUR packet is designed to include a wake-up user identifier (ID) that is unique to a wireless device on a WLAN such that when a WUR signal is broadcast from the wireless AP of the WLAN, a wireless device receives the WUR signal and is able to identify whether the WUR signal is intended for the respective wireless device based on the wake-up user ID. The WUR packet is encoded and modulated in compliance with a WLAN standard, e.g., the 802.11 standard. In this way, the WUR mechanism described herein may be operated with, and/or implemented at any wireless AP and device/station compliant with the 802.11 standard, without re-designing the WiFi receiver.

Figure 1:
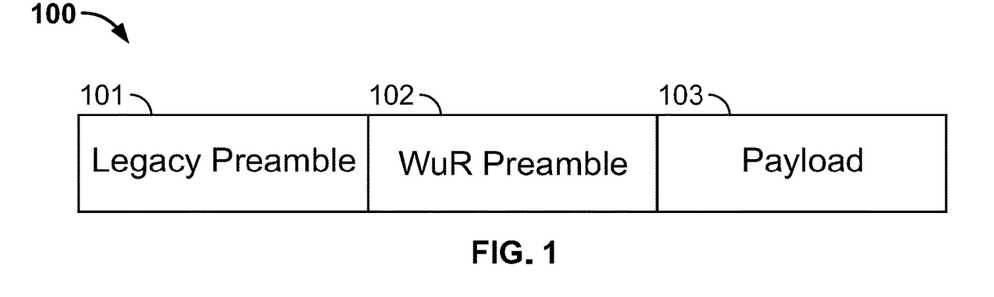
FIG. 1 is a block diagram illustrating an example data frame of a WUR packet, according to some embodiments described herein.

FIG. 1 is a block diagram illustrating an example data frame of a WUR packet, according to some embodiments described herein. Data frame 100 shows a legacy preamble portion 101, a WUR preamble portion 102, and a payload portion 103. The legacy preamble 101 is included in the WUR frame 100 to provide co-existence with a WiFi network. For example, the legacy preamble 101 may be defined under an 802.11 standard.

The WUR preamble 102 is placed after the legacy preamble 101 in the WUR frame 100. The WUR preamble 102 includes data fields including transmission timing information to facilitate the synchronization of a WUR transmitter and a WUR receiver.

The payload 103 is placed after the WUR preamble 102 in the WUR frame 100, which includes data indicating the respective data frame is a WUR frame. The payload 103 includes a wake-up user ID and other data information (e.g., the Basic Service Set (BSS), color, group ID, and etc.). For example, when an LP device receives a WUR signal, the LP device may extract the wake-up user ID from the payload 103 of the WUR frame 100 to determine whether the WUR frame is intended for the LP device itself, by verifying whether the wake-up user ID matches the user ID that is previously assigned to the LP device.

An AP is configured to compute and assign a wake-up user ID to each LP device in the local network. For example, the AP is configured to compute a hash value of the medium access control (MAC) address of each LP device, and use the computed hash value as the wake-up user ID for each respective LP device. For another example, the AP is configured to assign an M-bit unique sequence to an LP device, and then pad a P-bit cyclic redundancy check (CRC) sequence to the M-bit unique sequence, resulting a sequence of (M+P) bits as the wake-up user ID. For instance, if the AP detects that there is a number of X LP devices associated with the AP on the network, the AP is configured to generate at least M=$\lceil \log_2 X \rceil$ bits to assign to the number of X LP devices. The AP may choose the number M to be greater than $\lceil \log_2 X \rceil$ such that when new LP devices join the local network associated with the AP, the AP can generate and assign new user IDs to the new LP devices. For another example, the AP is configured to use the device ID associated with each LP device under the 802.11 standard as the user ID for WUR signal transmission.

Figure 2:
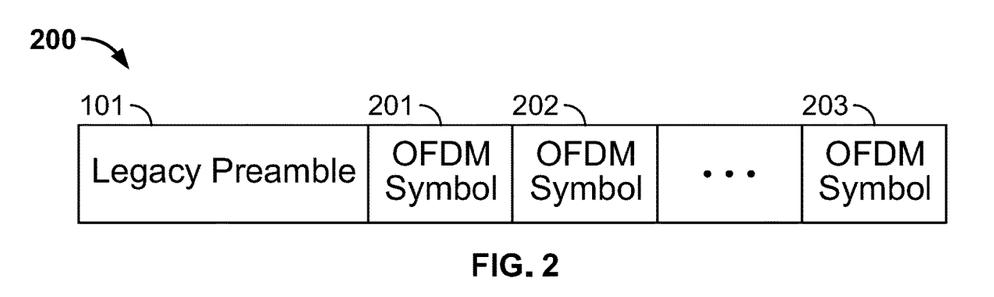
FIG. 2 is a block diagram illustrating an example data frame for payload modulation of the WUR packet illustrated in FIG. 1, using orthogonal frequency division multiplexing (OFDM), according to some embodiments described herein.

FIG. 2 is a block diagram illustrating an example data frame for payload modulation of the WUR packet illustrated in FIG. 1, using orthogonal frequency division multiplexing (OFDM), according to some embodiments described herein. Diagram 200 shows a data frame that includes the legacy preamble 101, as discussed in relation to FIG. 1, and the payload portion (e.g., see 103 in FIG. 1) encoded into one or more OFDM symbols 201-203. It should be noted that the numerals 201-203 are for illustrative purpose only, and the data frame 200 may include any number of OFDM symbols, such as two, three, four, five, and/or the like. It should also be noted that the payload portion (e.g., see 103 in FIG. 1) may be encoded/modulated under OFDM or onto a single carrier. If the payload is encoded/modulated onto a single carrier, the data frame 200 may include a number of single-carrier symbols placed after the legacy preamble 101, e.g., similar to the OFDM symbols 201-203.

For each OFDM symbol 201-203 (or single-carrier symbols), the symbol is configured to signal N bits of the payload, N≥1. In some implementations, modulation schemes that facilitate a simple receiver design may be adopted to modulate every N bits of the payload, such as but not limited to on-off keying (OOK) modulation.

Figure 3:
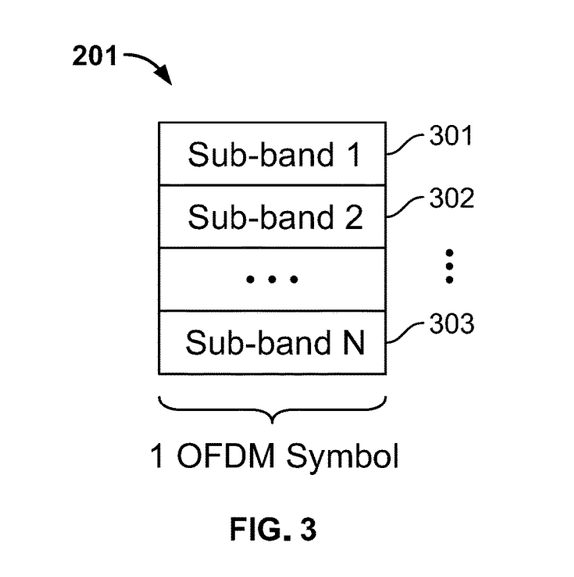
FIGS. 3-5 are block diagrams, each illustrating an example modulation scheme for an OFDM symbol illustrated in FIG. 2, according to some embodiments described herein.
Figure 4:
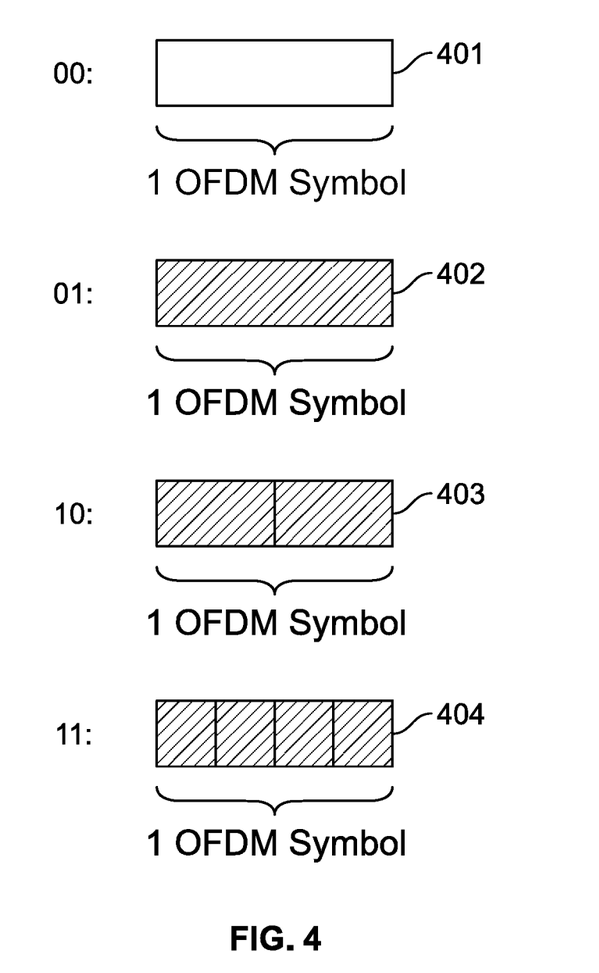
Figure 5:
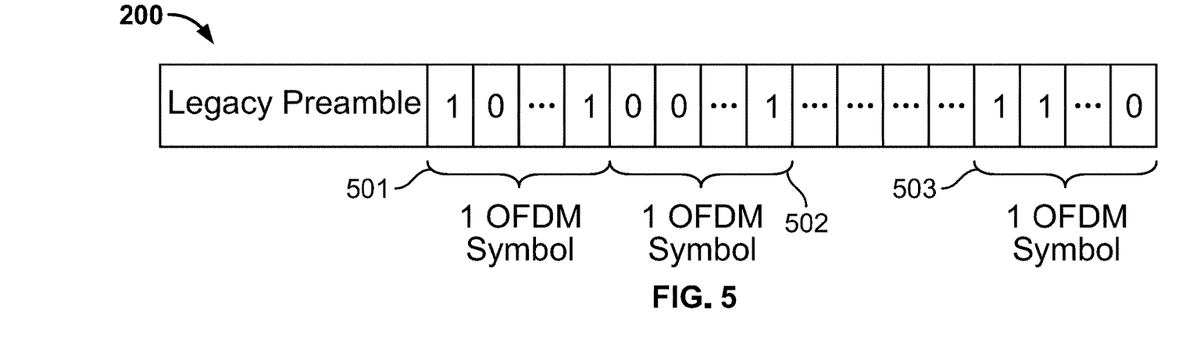

FIGS. 3-5 are block diagrams, each illustrating an example modulation scheme for an OFDM symbol illustrated in FIG. 2, according to some embodiments described herein. In FIG. 3, an OFDM symbol (e.g., 201 in FIG. 2) is transmitted over a number of sub-bands 301-303. For each OFDM symbol (e.g., see 201 in FIG. 2) in a modulated WUR frame (e.g., see 200 in FIG. 2), the AP is configured to use frequency-shift keying (FSK) modulation. For example, the AP is configured to divide the whole bandwidth of the channel into a number of N sub-bands or sub-channels 301-303, wherein the number N is equivalent to the number of N bits of the payload that each OFDM symbol represents. It should be noted that the numerals 301-303 are for illustrative purpose only, and the number N of sub-bands may be two, three, four, five, and/or the like. Each sub-band 301-303 is configured to carry one bit, e.g., OOK modulation within each sub-band. Thus, the AP is configured to transmit no signal on a respective sub-band, when the bit to be transmitted is zero, and to transit a signal on the respective sub-band when the bit to be transmitted is one. In this way, at least one OFDM symbol is configured to carry N bits of the user ID sequence.

In FIG. 4, for each OFDM symbol (e.g., 201-203 in FIG. 2), the AP is configured to use time-domain decimation to generate repetition in time domain. If the OFDM symbol is configured to carry N bits of a user ID sequence, the AP is configured to use $2^N$ possible repetition patterns within the OFDM symbol to design different frequency domain waveforms for transmission. For example, when N=2, the AP is configured to use four repetition patterns to represent all possible two-bit sequences, e.g., {00, 01, 10, 11}. As shown at 401, when the sequence of "00" is to be transmitted, the AP is configured to transmit no signal. As shown at 402, when the sequence of "01" is to be transmitted, the AP is configured to transmit a signal for the entire symbol time but with no repetition. As shown at 403, when the sequence of "10" is to be transmitted, the AP is configured to transmit a signal that is repeated twice within one symbol time. As shown at 404, when the sequence of "11" is to be transmitted, the AP is configured to transmit a signal that is repeated four times within one symbol time. Further detail relating to frequency domain waveform design is provided in relation to FIGS. 6-9.

In FIG. 5, the AP is configured to use a short symbol to carry each bit. For example, a short symbol may have a duration of, e.g., half an OFDM symbol (2 μs), OFDM symbol (1 μs), and/or the like. The symbol time of each OFDM symbol 501-503 in the data frame 200 can be divided into a number of short symbols. For each short symbol that is used to transmit one bit, OOK modulation is used, e.g., transmitting a signal when a bit of one is to be transmitted, and transmitting nothing when a bit of zero is to be transmitted. For each OFDM symbol 501-503, the AP is configured to generate short symbols by truncating the respective OFDM symbol in the time domain. For example, as shown at OFDM symbol 501, if four bits are to be transmitted by the OFDM symbol 501, the OFDM symbol 501 is truncated into four short symbols.

Figure 6:
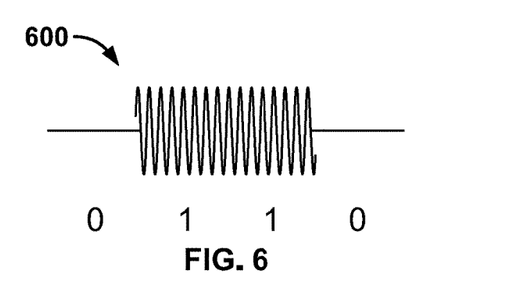
FIGS. 6-9 are block diagrams, each illustrating an example modulated waveform to transmit a single-carrier symbol when the WUR packet illustrated in FIG. 1 is encoded onto a single carrier, according to some embodiments described herein.

FIGS. 6-9 are block diagrams, each illustrating an example modulated waveform to transmit a single-carrier symbol, according to some embodiments described herein. When the payload portion 103 of WUR frame 100 is modulated onto a single carrier, e.g., OFDM symbols 201-203 are replaced by single-carrier symbols, respectively, FIGS. 6-9 provide example modulated waveforms for transmission. In FIG. 6, an example modulated waveform 600 is shown to transmit a sequence of "0110." Each single-carrier symbol carries one bit, and each bit is modulated using OOK modulation. Thus, the waveform 600 shows the transmission of a signal corresponding to a bit of "1," and no signal transmission corresponding to a bit of "0."

Figure 7:
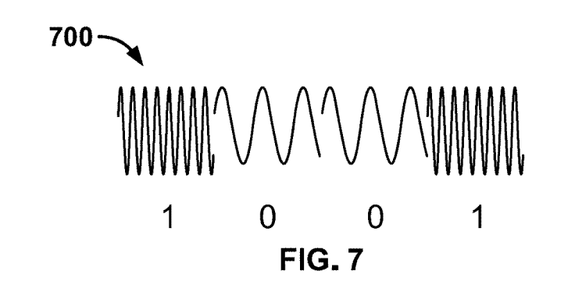

In FIG. 7, an example modulated waveform 700 is shown to transmit a sequence of "1001." Each symbol is configured to carry N bits (N=1 in this example) using FSK modulation.

Figure 8:
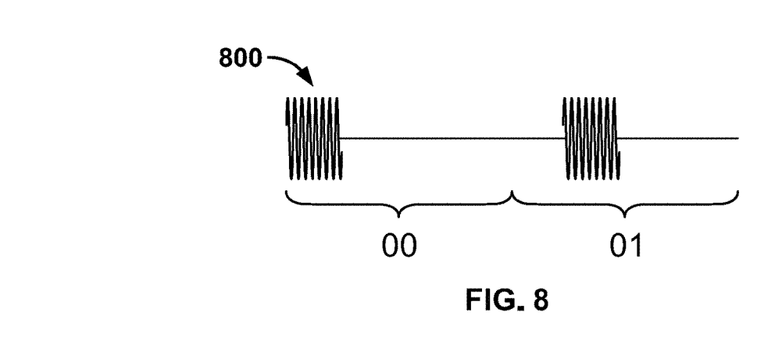

In FIG. 8, an example modulated waveform 800 is shown to transit a sequence of "0001." Each symbol is configured to carry N bits (N=2 in this example) using pulse-position modulation (PPM). Thus, in each symbol, the AP is configured to transmit a pulse at one of $2^N$ (four in this example) different positions. As shown at 800, when the transmission sequence is "00," a pulse is transmitted at the first position over four positions; and when the transmission sequence is "01," a pulse is transmitted at a second position over four positions.

Figure 9:
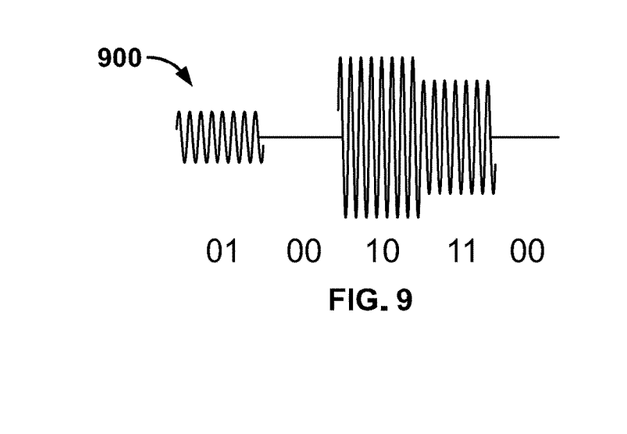

In FIG. 9, an example modulated waveform 900 is shown to transit a sequence of "0100101100." Each symbol is configured to carry N bits (N=2 in this example) using $2^N$ power levels under pulse-amplitude modulation (PAM). Thus, in each symbol, the AP is configured to transmit the two-bit sequence with an amplitude of the waveform reflecting a corresponding power level.

Figure 10:
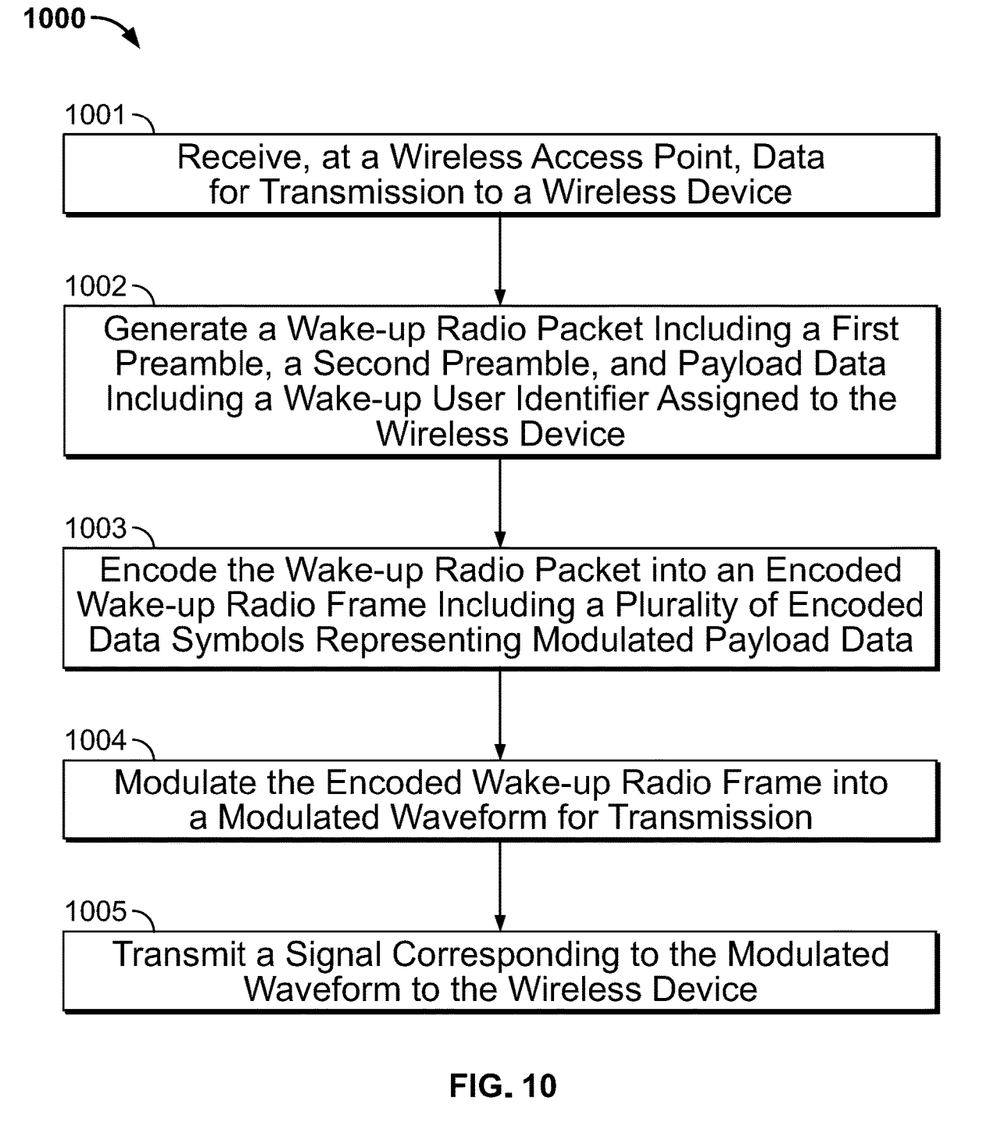
FIG. 10 is a flow diagram illustrating an example process of generating a WUR packet as illustrated in FIG. 1, according to some embodiments described herein.

FIG. 10 is a flow diagram illustrating an example process of generating a WUR packet as illustrated in FIG. 1, according to some embodiments described herein. Diagram 1000 describes a work flow that may be implemented at a wireless AP of a WLAN that is operated under the 802.11 standard. At 1001, the wireless access point is configured to receive, e.g., from an Internet Protocol (IP) backbone, an Internet router, a wireless device on the same WLAN, etc., data for transmission to a wireless device. At 1002, the wireless AP is configured to generate a WUR packet (e.g., see packet 100 in FIG. 1) that includes a first preamble (e.g., see legacy preamble 101 in FIG. 1), a second preamble (e.g., see WUR preamble 102 in FIG. 1), and payload data (e.g., see payload 103 in FIG. 1). The wireless AP is configured to include a wake-up user ID assigned to the wireless device in the payload. At 1003, the wireless AP is configured to encode the WUR packet into an encoded WUR frame (e.g., see data frame 200 in FIG. 2) that includes a plurality of encoded data symbols represented modulated payload data. The encoded data symbols may be OFDM symbols, or single-carrier symbol. When OFDM symbols are used, the wireless AP is configured to use the OFDM symbol to transmit data bits representing the wake-up user ID (e.g., see transmission schemes in FIGS. 3-5). At 1004, the wireless AP is configured to modulate the encoded WUR frame into a modulated waveform for transmission, e.g., as described in FIGS. 6-9. At 1005, the wireless AP is configured to transmit, via a lower-power WUR transmitter, a signal corresponding to the modulated waveform to the wireless device, as a wake-up signal when the wireless device is operated at a low power mode.

Figure 11:
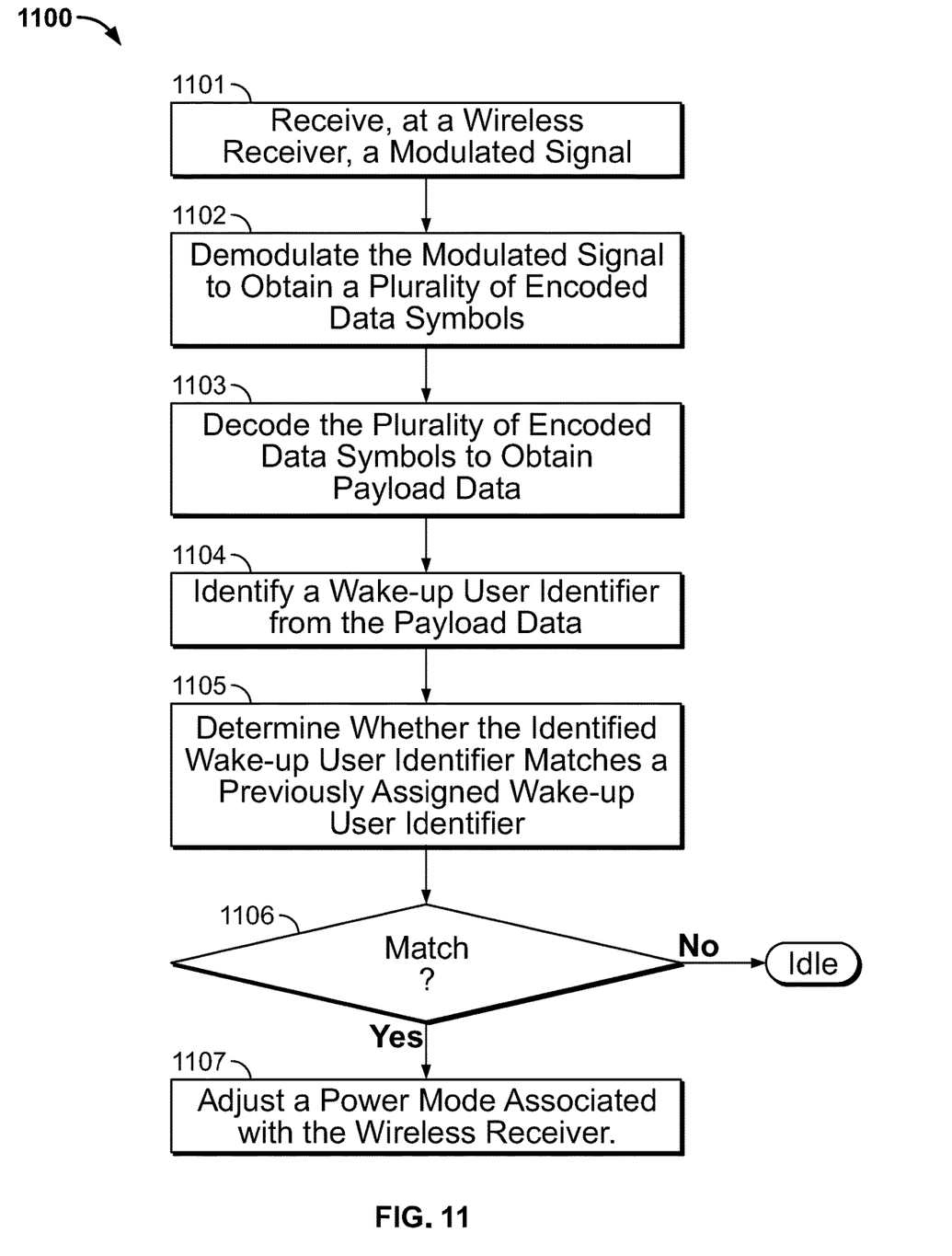
FIG. 11 is a flow diagram illustrating an example process of modulating and transmitting a WUR packet as illustrated in FIG. 2, according to some embodiments described herein.

FIG. 11 is a flow diagram illustrating an example process of modulating and transmitting a WUR packet as illustrated in FIG. 2, according to some embodiments described herein. Diagram 1000 describes a work flow that may be implemented at a wireless device on a WLAN that is operated under the 802.11 standard. For example, the wireless device is configured to be operated on the WLAN with the wireless AP described in relation to FIG. 10.

At 1101, the wireless device is configured to receive, via a low-power WUR receiver, a modulated signal, e.g., the signal transmitted from the wireless AP at 1000 in FIG. 10. For example, the wireless device, when operated at a power-saving mode, may have the WiFi module turned off, but is configured to receive signals via the low-power WUR receiver which is in companion with the WiFi receiver at the wireless device. At 1102, the wireless device is configured to demodulate the modulated signal to obtain a plurality of encoded data symbols, e.g., OFDM symbols or single-carrier symbols. At 1103, the wireless device is configured to decode the plurality of encoded data symbols to obtain payload data (e.g., 103 in FIG. 1). At 1004, the wireless device is configured to identify a wake-up user ID from the payload data, e.g., in a form of a sequence of bits. At 1105, the wireless device is configured to compare the identified sequence of bits with a previously assigned and stored wake-up user ID to determine whether the wake-up signal is intended for the wireless device itself. At 1106, if the comparing results in a match between the identified sequence of bits and the previously assigned and stored wake-up user ID, the wireless device is configured to adjust a power mode, e.g., by terminating a low-power operation mode and turning on the WiFi module (e.g., a WiFi transmitter and/or a WiFi receiver) associated with the wireless device, so that the wireless device is prepared to receive data from the AP via the WiFi receivers. At 1106, if no match is found, the wireless device is configured to remain at a low power or idle mode.

Various embodiments discussed in conjunction with FIGS. 1-11 are performed by various electronic components of one or more electronic circuits, such as but not limited to an integrated circuit, and/or the like. Various components discussed throughout this disclosure such as, but not limited to a wireless AP, a wireless device, and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 10 does not necessarily require the particular order shown, or sequential order, to achieve desirable results. In certain implementations, multitasking and parallel processing may be advantageous. Other variations are within the scope of the following claims.

What is claimed is:

1. A method for transmitting a wake-up radio signal to low power devices in a wireless local area network, the method comprising:

receiving, at a wireless access point, data for transmission to a wireless device;
generating a wake-up radio packet including:
a first preamble,
a second preamble, and
payload data including a wake-up user identifier assigned to the wireless device, wherein a number of bits of the wake-up identifier is based on a number of low power devices in the wireless local area network and a number of padding bits;
encoding the wake-up radio packet into an encoded wake-up radio frame including a plurality of encoded data symbols representing modulated payload data;
modulating the encoded wake-up radio frame onto a modulated waveform for transmission; and
transmitting, via a low-power wireless transmitter, a signal corresponding to the modulated waveform to the wireless device.

2. The method of claim 1, wherein the generating the wake-up radio packet comprises:
configuring the first preamble defined by a wireless communication protocol operable with the wireless local area network; and
configuring the second preamble as identifying a type of the wake-up radio packet.

3. The method of claim 1, wherein the generating the wake-up radio packet comprises:
generating a first number of bits representing the wireless device;
generating a second number of cyclic redundancy check bits for the first number of bits; and
concatenating the first number of bits and the second number of cyclic redundancy check bits; and
assigning the concatenated bits as the wake-up user identifier for the wireless device.

4. The method of claim 1, wherein the encoding the wake-up radio packet comprises:
encoding the wake-up radio packet into a plurality of one or more orthogonal frequency-division multiplexing (OFDM) symbols.

5. The method of claim 4, further comprising:
when the wake-up user identifier includes a number N of bits:
dividing a bandwidth for transmitting the wake-up radio packet into N sub-channels; and
transmitting one of the number N bits over one of the N sub-channels using on-off keying modulation.

6. The method of claim 4, further comprising:
when the wake-up user identifier includes a number N of bits:
designing a number 2N of repetition patterns within a symbol time corresponding to an OFDM symbol from the plurality of OFDM symbols;
determining a repetition pattern from the number 2N of repetition patterns based on the wake-up user identifier; and
transmitting the number N of bits using the repetition pattern.

7. The method of claim 4, further comprising:
for each OFDM symbol from the plurality of OFDM symbols:
determining a short symbol having a duration shorter than a symbol time corresponding to the respective OFDM symbol; and
transmitting one bit of the wake-up user identifier during the duration corresponding to the short symbol.

8. The method of claim 7, further comprising:
determining the duration of the short symbol from a group consisting of half the symbol time, a quarter of the symbol time and one-eighth of the symbol time based on a length of the wake-up user identifier.

9. The method of claim 8, further comprising:
encoding the wake-up radio packet into a plurality of single-carrier data symbols; and
selecting the modulated waveform corresponding to the plurality of single-carrier data symbols based on a modulation scheme from the group of on-off keying modulation, frequency shift keying modulation, pulse-position modulation and pulse-amplitude modulation.

10. A system for transmitting a wake-up radio signal to low power devices in a wireless local area network, the system comprising:
a wireless receiver, at a wireless access point, configured to receive data for transmission to a wireless device;
processing circuitry, at the wireless access point, configured to:
generate a wake-up radio packet including:
a first preamble,
a second preamble, and
payload data including a wake-up user identifier assigned to the wireless device, wherein a number of bits of the wake-up user identifier is based on a number of low power devices in the wireless local area network and a number of padding bits;
encode the wake-up radio packet into an encoded wake-up radio frame including a plurality of encoded data symbols representing modulated payload data;
modulate the encoded wake-up radio frame into a modulated waveform for transmission; and
a low-power wireless transmitter, at the wireless access point, configured to transmit a signal corresponding to the modulated waveform to the wireless device.

11. The system of claim 10, wherein the processing circuitry, when generating the wake-up radio packet, is further configured to:
configure the first preamble defined by a wireless communication protocol operable with the wireless local area network; and
configure the second preamble as identifying a type of the wake-up radio packet.

12. The method of claim 10, wherein the processing circuitry, when generating the wake-up radio packet, is further configured to:
generate a first number of bits representing the wireless device;
generate a second number of cyclic redundancy check bits for the first number of bits; and
concatenate the first number of bits and the second number of cyclic redundancy check bits; and
assign the concatenated bits as the wake-up user identifier for the wireless device.

13. The system of claim 10, wherein the processing circuitry, when encoding the wake-up radio packet, is configured to:
encode the wake-up radio packet into a plurality of one or more orthogonal frequency-division multiplexing (OFDM) symbols.

14. The system of claim 13, wherein the processing circuitry is further configured to:
when the wake-up user identifier includes a number N of bits:
divide a bandwidth for transmitting the wake-up radio packet into N sub-channels; and transmit one of the number N bits over one of the N sub-channels using on-off keying modulation.

15. The system of claim 13, wherein the processing circuitry is further configured to:
when the wake-up user identifier includes a number N of bits:
design a number 2N of repetition patterns within a symbol time corresponding to an OFDM symbol from the plurality of OFDM symbols;
determine a repetition pattern from the number 2N of repetition patterns based on the wake-up user identifier; and
transmit the number N of bits using the repetition pattern.

16. The system of claim 13, wherein the processing circuitry is further configured to:
for each OFDM symbol from the plurality of OFDM symbols:
determine a short symbol having a duration shorter than a symbol time corresponding to the respective OFDM symbol; and
transmit one bit of the wake-up user identifier during the duration corresponding to the short symbol.

17. The system of claim 16, wherein the processing circuitry is further configured to:
determine the duration of the short symbol from a group consisting of half the symbol time, a quarter of the symbol time and one-eighth of the symbol time based on a length of the wake-up user identifier.

18. The system of claim 17, wherein the processing circuitry is further configured to:
encode the wake-up radio packet into a plurality of single-carrier data symbols; and
select the modulated waveform corresponding to the plurality of single-carrier data symbols based on a modulation scheme from the group of on-off keying modulation, frequency shift keying modulation, pulse-position modulation and pulse-amplitude modulation.

19. A method for receiving a wake-up radio signal in a wireless communication system, the method comprising:
receiving, at a low-power wireless receiver, a modulated signal;
demodulating the modulated signal to obtain a plurality of encoded data symbols;
decoding the plurality of encoded data symbols to obtain payload data;
identifying a wake-up user identifier from the payload data, wherein a number of bits of the wake-up identifier is based on a number of low power devices in the wireless communication system and a number of padding bits;
determining whether the identified wake-up user identifier matches a previously assigned wake-up user identifier; and
in response to determining that the identified wake-up user identifier matches a previously assigned wake-up user identifier, adjusting a power mode associated with the low-power wireless receiver.

* * * * *